United States Patent
Zhang

(10) Patent No.: US 11,735,783 B2
(45) Date of Patent: Aug. 22, 2023

(54) BATTERY MODULE

(71) Applicant: JIANGSU CONTEMPORARY AMPEREX TECHNOLOGY LIMITED, Changzhou (CN)

(72) Inventor: Hua Zhang, Changzhou (CN)

(73) Assignee: JIANGSU CONTEMPORARY AMPEREX TECHNOLOGY LIMITED

( * ) Notice: Subject to any disclaimer, the term of this patent is extended or adjusted under 35 U.S.C. 154(b) by 498 days.

(21) Appl. No.: 16/494,667

(22) PCT Filed: Jul. 8, 2019

(86) PCT No.: PCT/CN2019/095044
§ 371 (c)(1),
(2) Date: Aug. 14, 2020

(87) PCT Pub. No.: WO2020/258371
PCT Pub. Date: Dec. 30, 2020

(65) Prior Publication Data
US 2020/0411925 A1    Dec. 31, 2020

(30) Foreign Application Priority Data
Jun. 28, 2019  (CN) .......................... 201921005583.1

(51) Int. Cl.
*H01M 10/6554* (2014.01)
*H01M 10/42* (2006.01)
(Continued)

(52) U.S. Cl.
CPC ... *H01M 10/6554* (2015.04); *H01M 10/4207* (2013.01); *H01M 50/271* (2021.01); *H01M 50/105* (2021.01); *H01M 50/211* (2021.01)

(58) Field of Classification Search
None
See application file for complete search history.

(56) References Cited

U.S. PATENT DOCUMENTS

| | | |
|---|---|---|
| 2015/0044538 A1 | 2/2015 | Katayama et al. |
| 2018/0138559 A1 | 5/2018 | Omura |
| 2018/0212292 A1 | 7/2018 | Maguire et al. |

FOREIGN PATENT DOCUMENTS

| | | | |
|---|---|---|---|
| CN | 106684505 A | * | 5/2017 |
| CN | 206163566 U | | 5/2017 |

(Continued)

OTHER PUBLICATIONS

CN106684505A—machine translation.*
(Continued)

*Primary Examiner* — Haixia Zhang
(74) *Attorney, Agent, or Firm* — Tucker Ellis LLP

(57) ABSTRACT

The present disclosure relates to the technical field of energy storage devices, and particularly, to a battery module. The battery module includes a lower case, a plurality of battery cells sequentially stacked and received in the lower case, and a heat conducting plate. The lower case is connected to the heat conducting plate through an engaging assembly. In the battery module according to the present disclosure, the heat conducting plate and the lower case are connected through the engaging assembly, without performing a welding process required in the related art, thereby avoiding failures of other components caused by metal spattering.

10 Claims, 12 Drawing Sheets

(51) Int. Cl.
*H01M 50/271* (2021.01)
*H01M 50/105* (2021.01)
*H01M 50/211* (2021.01)

(56) References Cited

FOREIGN PATENT DOCUMENTS

| CN | 108388322 A | 8/2018 |
| CN | 207781676 U | 8/2018 |

OTHER PUBLICATIONS

Supplementary European Search Report from corresponding European Application No. 19762696, dated Oct. 30, 2020, 9 pages.
International Search Report from corresponding International Application No. PCT/CN2019/095044, dated Mar. 16, 2020, 5 pages.

* cited by examiner

BATTERY MODULE

TECHNICAL FIELD

The present disclosure relates to the field of energy storage devices, and particularly, to a battery module.

BACKGROUND

A battery module is generally used as an energy storage system of a new energy vehicle, and the existing battery module includes a metal lower case. The metal lower case may generate spatter when being welded with other components such as an upper cover, and thus can lead to functional failures of other components. In addition, the metal lower case has a great weight and a lot of parts thereof are required to be electrically insulated. Once the insulation function of some parts fails, the quality of the battery module may be problematic.

A heat conducting plate is usually provided to dissipate heat from the battery module. When the lower case is welded to the heat conducting plate, the above-mentioned spattering problem also exists. Therefore, it is urgent to find a solution how to form a stable connection between the lower case and the heat conducting plate.

SUMMARY

The present disclosure provides a battery module, aiming to solve the problems in the related art and achieve a stable connection between the lower case and the heat conducing plate.

The present disclosure provides a battery module, including a lower case, a plurality of battery cells sequentially stacked and received in the lower case; and a heat conducting plate. The lower case is connected to the heat conducting plate through an engaging assembly, and the engaging assembly is configured to limit relative movement of the lower case and the heat conducting plate in a height direction and a width direction of the battery module.

In an embodiment, the lower case is made of an insulating material.

In an embodiment, the heat conducting plate is made of metal.

In an embodiment, the engaging assembly includes a boss formed on the lower case, and an engaging hole formed in the heat conducting plate; and the boss is engaged with and fitted in the engaging hole.

In an embodiment, the boss includes a connecting portion and an engaging portion that are connected to each other; the engaging hole includes a first hole and a second hole that communicate with each other. The engaging portion is configured to pass through the first hole, the connecting portion is fitted in the second hole, and the engaging portion is configured to limit the heat conducting plate in the height direction of the battery module.

In an embodiment, a filling portion is provided in the first hole, and the filling portion is configured to limit the heat conducting plate in a length direction of the battery module.

In an embodiment, the boss includes a first boss and a second boss, and the first boss is provided with a first oblique surface on each of two sides of the first boss, the first oblique surface inclining towards the second boss. The engaging hole includes a first hole and a second hole, and an inner wall surface of the second hole has a second oblique surface and a vertical surface that are connected to each other, the second oblique surface inclining towards the vertical surface. When the first oblique surface matches the second oblique surface and the second boss matches the vertical surface, a surface of the first boss facing away from the second boss is flush with a surface of the heat conducting plate facing away from the lower case.

In an embodiment, a plurality of engaging holes is provided at an edge portion of the heat conducting plate along a length direction of the battery module.

In an embodiment, the lower case includes two side plates and two end plates fixedly connected to the two side plates, respectively; and the boss is provided at a bottom of each of the two side plates.

In an embodiment, the lower case is provided with a heat conducting structural adhesive fixed at a bottom of the lower case.

In an embodiment, the battery module further includes an upper cover; the upper cover and the lower case define a receiving cavity for receiving the plurality of the battery cells.

The technical solutions provided by the present disclosure can bring the following beneficial effects.

In the battery module provided by the present disclosure, the heat conducting plate and the lower case are connected through the engaging assembly to limit the relative movement of the lower case and the heat conducting plate in the height direction and the width direction of the battery module, without performing a welding process required in the related art, thereby avoiding failures of other components caused by metal spattering. In addition, the lower case and the heat conducting plate adopt a split structure, so that the lower case and the heat conducting plate can be made of different materials. For example, the lower case can be made of an insulating material to solve the problem of metal spattering, and the heat conducting plate can be made of a material having good thermal conductivity, thereby improving the heat dissipation of the battery module.

It should be understood that the above general description and the following detailed description are merely illustrative and are not intended to limit the present disclosure.

DESCRIPTION OF DRAWINGS

In order to more clearly illustrate the technical solutions of the present disclosure or in the related art, drawings used in the specific embodiments or the description of the related art will be briefly described below. The drawings introduced as below merely illustrate some embodiments of the present disclosure, and those skilled in the art can obtain other drawings based on these drawings without any creative efforts.

REFERENCE SIGNS 1 battery module;
  11 lower case;
    111 boss;
      111a connecting portion;
      111b engaging portion;
      111c first boss;
        111c1 first oblique surface;
      111d second boss;
    112 side plate
      112a first plate;
      112b second plate;
    113 end plate;
  12 battery cell;
  13 top cover;
  14 structural adhesive;
  15 heat conducting plate;
    151 engaging hole;
      151a first hole;
      151b second hole;
        151b1 second oblique surface;
        151b2 vertical surface;
2 engaging assembly.

The drawings described herein, which illustrate the embodiments of the present disclosure, are incorporated in and constitute a part of the specification, and used to explain the principles of the present application in combination with the specification.

DESCRIPTION OF EMBODIMENTS

The technical solutions of the present disclosure will be clearly and thoroughly described as follow with reference to the accompanying drawings. It is obvious that the described embodiments are parts of the present disclosure, rather than all embodiments. Based on the embodiments of the present disclosure, all other embodiments obtained by those skilled in the art without paying any inventive efforts shall fall within the protection scope of the present disclosure.

Figure 1:
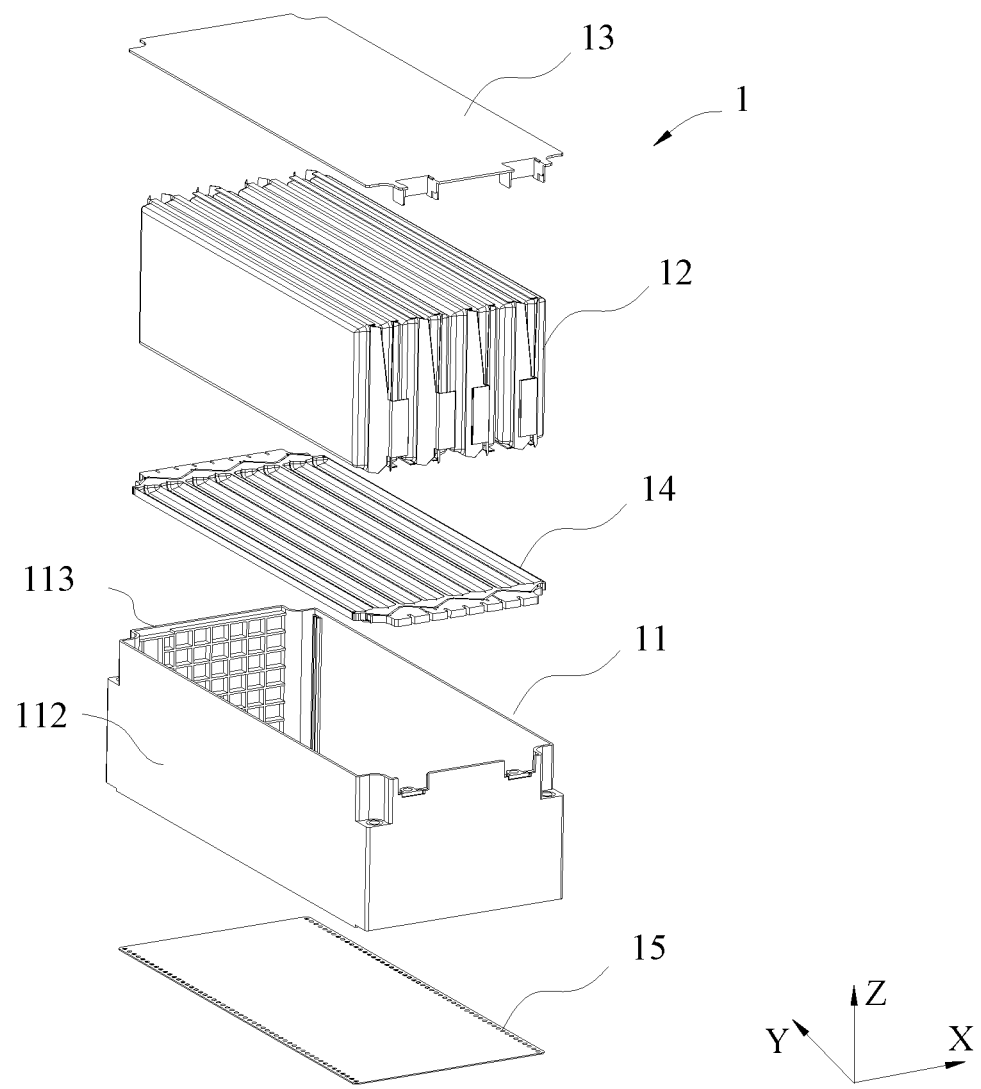
FIG. 1 is an exploded view of a battery module provided in an embodiment of the present disclosure.

FIG. 1 is an exploded view of a battery module provided in an embodiment of the present disclosure. As shown in FIG. 1, the embodiment of the present disclosure provides a battery module 1. The battery module 1 includes a lower case 11, a plurality of battery cells 12 sequentially stacked and received in the lower case 11, and an upper cover 13. The upper cover 13 and the lower case 11 together form a receiving cavity for receiving the plurality of battery cells 12.

An electrode assembly and electrolyte are disposed in the battery cell 12, and the electrode assembly electrochemically reacts with the electrolyte to output electric energy. Since heat generated during the reaction should be dissipated in time, the battery module 1 further includes a heat conducting plate 15 for heat dissipation.

Figure 4:
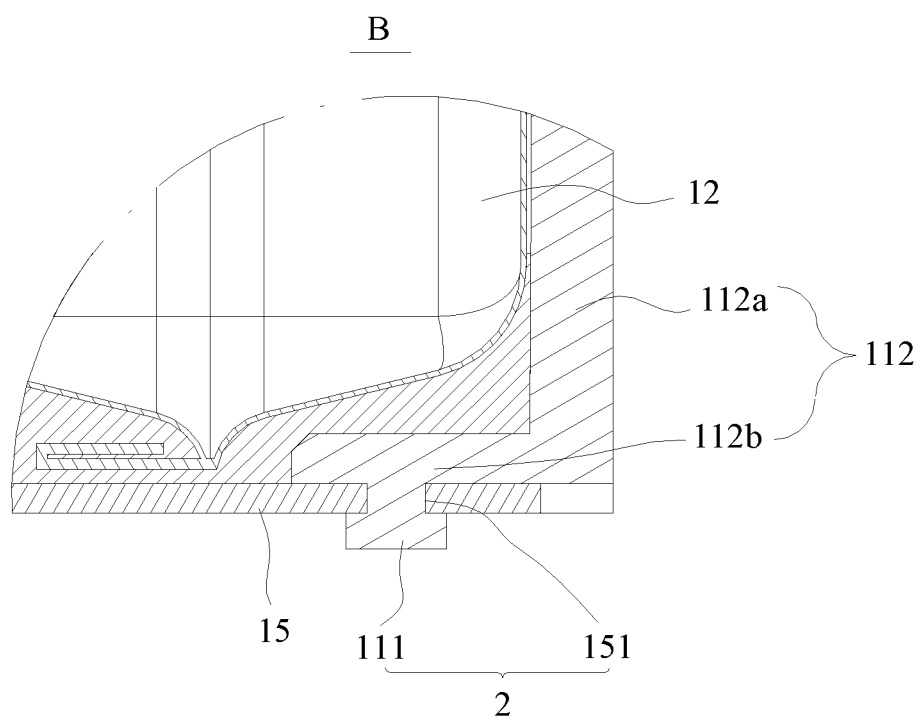
FIG. 4 is an enlarged view of a portion B in FIG. 3.

The said lower case 11 is connected to the heat conducting plate 15 through an engaging assembly 2 (as shown in FIG. 4). The engaging component 2 is used to limit relative movement of the lower case 11 and the heat conducting plate 15 in a height direction (direction Z) and a width direction (direction X) of the battery module 1, so that the welding process required in the related art is unnecessary, thereby solving the problem of failures of other components caused by the metal spattering.

The engaging assembly 2 can have various structural forms, for example, an engaging manner that a snap joint is fitted into an engaging hole. The snap joint is provided on the lower case 11, and the engaging hole is provided on the heat conducting plate 15. It is also possible to provide the engaging hole on the lower case 11 and provide the snap joint on the heat conducting plate 12. In the present embodiment, as an example, the engaging assembly 2 includes a boss 111 formed on the lower case 11 and an engaging hole 151 formed on the heat conducting plate 15, which will be specifically described below.

The lower case 11 and the heat conducting plate 15 adopt a split structure as described above, and thus the lower case 11 and the heat conducting plate 15 can be made of different materials. For example, the lower case 11 can be made of an insulating material, so as to solve the problem of metal spattering during the welding process of the metal lower case in the related art while reducing the weight of the battery module 1. The heat conducting plate 15 can be made of a material having good thermal conductivity, such as using a metal heat conducting plate 15 to dissipate the heat of the battery cells 12, thereby improving the heat dissipation effect. In addition, the lower case 11 made of the insulating material can solve problems such as many parts of the metal lower case are required to be insulated and insulations are often ineffective.

In an embodiment, the battery module 1 may include two side plates 112 and two end plates 113. The side plates 112 and the end plates 113 fix the battery cells 12 to restrict the expansion of the battery cells 12. The heat conducting plate 15 can be connected to ends of the side plates 112 and the end plates 113 facing away from the upper cover 13, i.e., being connected to bottom ends of the side plates 111 and the end plates 113. When the plurality of battery cells 12 is disposed in the lower case 11, the heat can be dissipated through the heat conducting plate 15.

Figure 2:
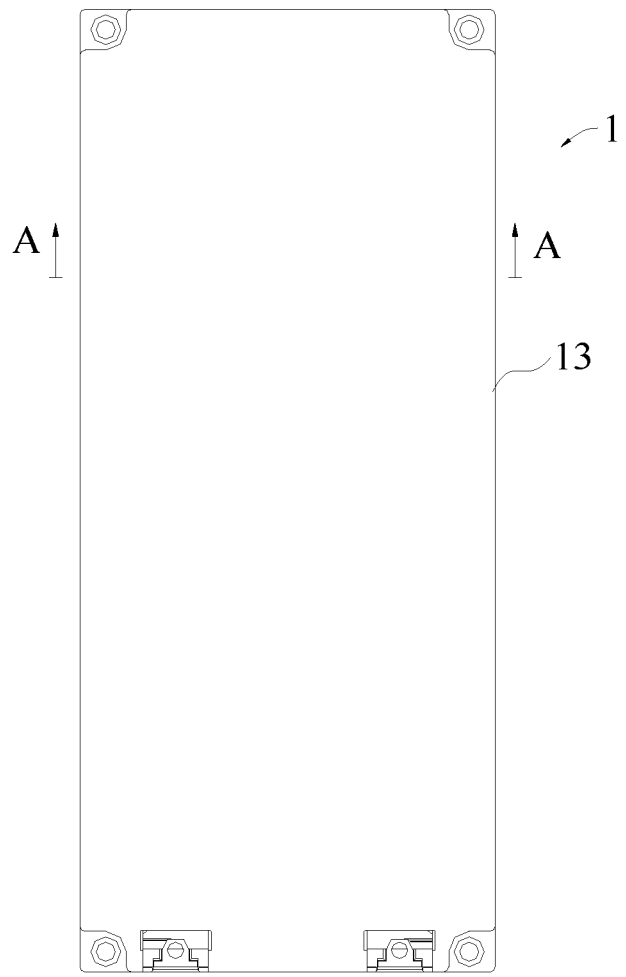
FIG. 2 is a top view of a battery module provided in a first embodiment of the present disclosure.
Figure 3:
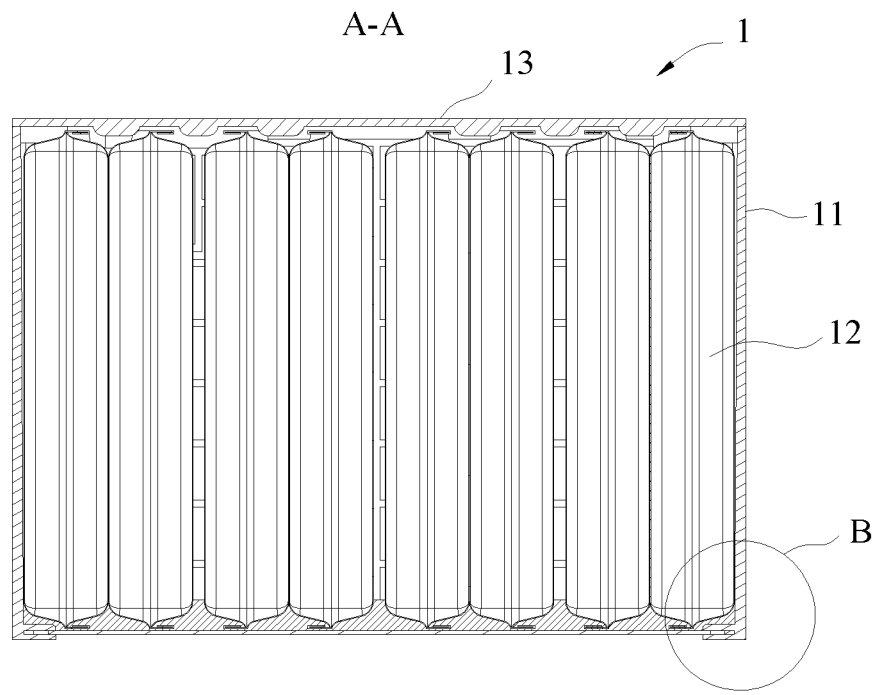
FIG. 3 is a cross-sectional view taken along line A-A in FIG. 2.

FIG. 2 is a top view of a battery module provided in a first embodiment of the present disclosure, FIG. 3 is a cross-sectional view taken along line A-A in FIG. 2, and FIG. 4 is an enlarged view of a portion B in FIG. 3.

In the first embodiment, the above engaging assembly 2 includes a boss 111 formed on the lower case 11 and an engaging hole 151 formed on the heat conducting plate 15, the boss 111 is fitted with the engaging hole 151. For example, the side panel 112 of the lower case 11 includes a first plate 112a and a second plate 112b that are connected in an L shape. The above boss 111 can be formed on the second plate 112b. The boss 111 can be formed during the injection molding process of the lower case 11, and the engaging hole 151 can be formed in the heat conducting plate 15 by mechanical processing. The formations of the boss 111 and the engaging hole 151 both are very simple, and it is also very easy to assemble the boss 111 and the engaging hole 151.

Figure 5:
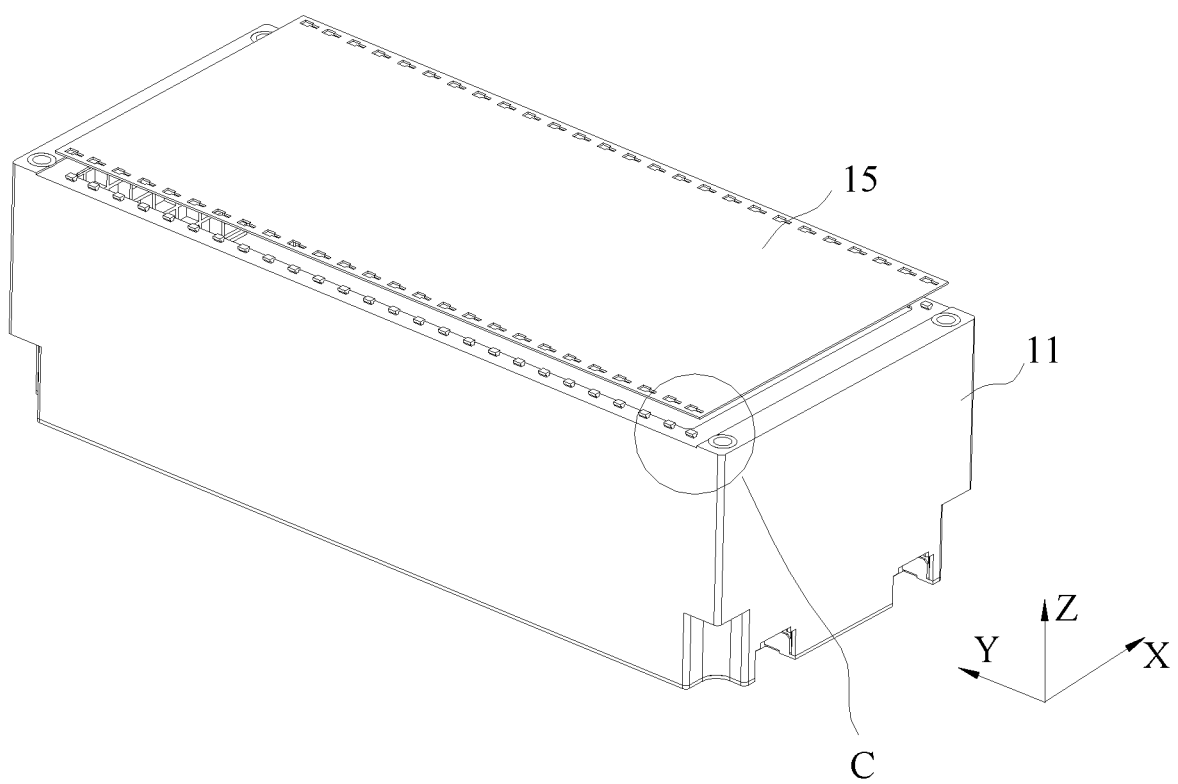
FIG. 5 is a schematic exploded view showing a structure of the battery module provided in the first embodiment of the present disclosure, in which a lower case and a heat conducting plate are to be fitted with each other.
Figure 6:
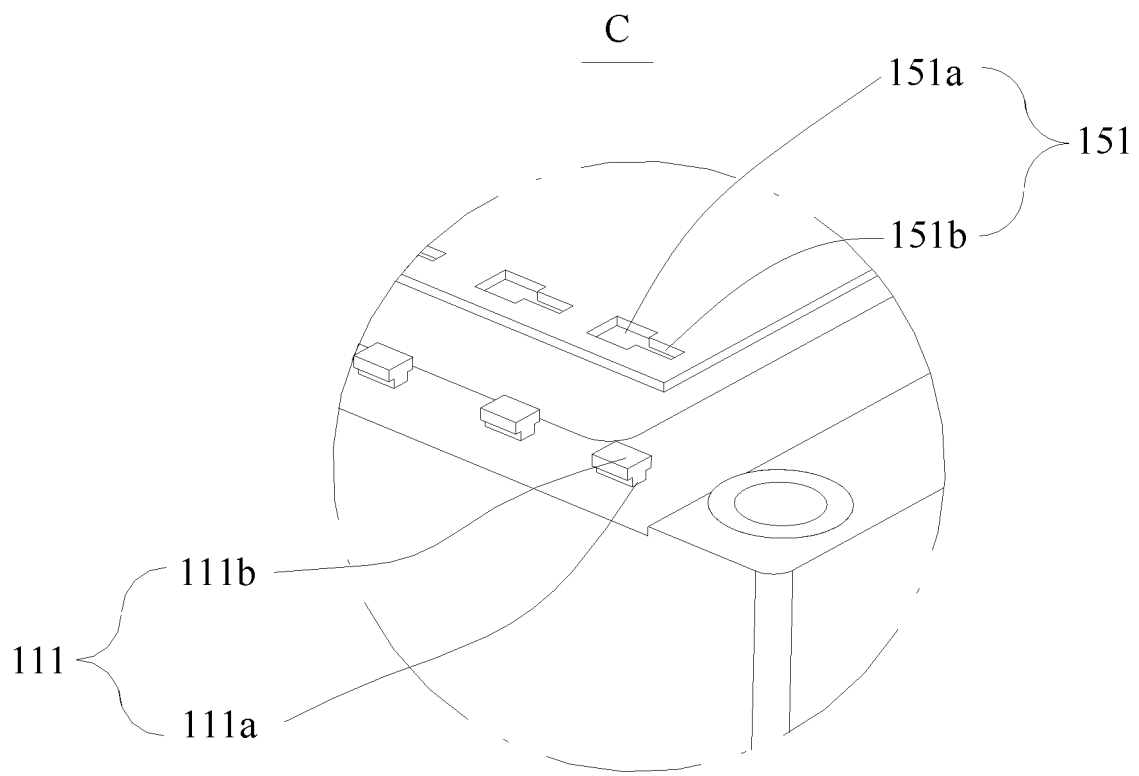
FIG. 6 is an enlarged view of a portion C in FIG. 5.
Figure 7:
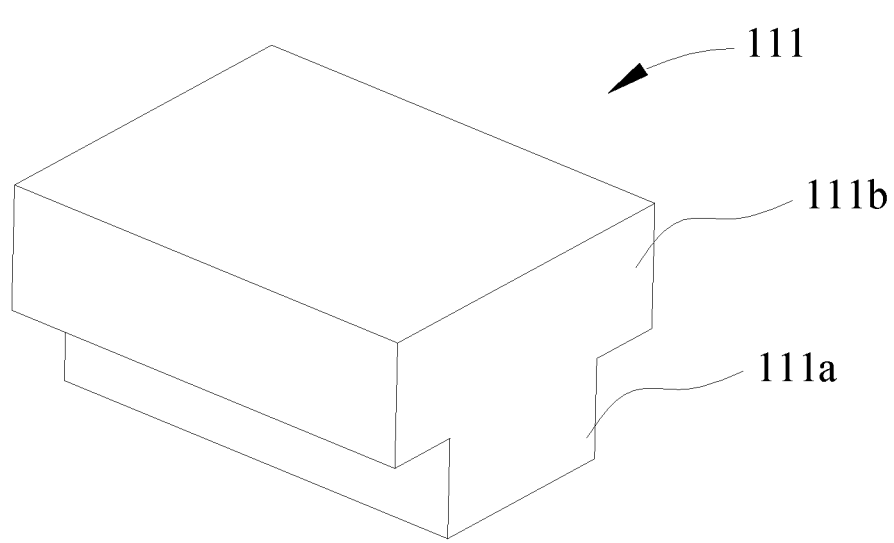
FIG. 7 is a structural schematic diagram of a boss in the battery module provided in the first embodiment of the present disclosure.

FIG. 5 is a schematic exploded view showing a structure of the battery module provided in the first embodiment of the present disclosure, in which the lower case and the heat conducting plate are to be fitted with each other, FIG. 6 is an enlarged view of a portion C in FIG. 5, and FIG. 7 is a structural schematic diagram of a boss in the battery module provided in the first embodiment of the present disclosure.

In the specific embodiment shown in FIG. 6 and FIG. 7, the boss 111 includes a connecting portion 111a and an engaging portion 111b that are connected to each other, and the engaging hole 151 includes a first hole 151a and a second hole 151b that communicate with each other. The engaging portion 111b can pass through the first hole 151a. After the connecting portion 111a is fitted in the second hole 151b, the engaging portion 111b limits the heat conducting plate 15 in the height direction (direction Z) of the battery module 1.

After the boss 111 and the engaging hole 151 are fitted with each other, the first hole 151a is filled with a filling glue or other filler to form a filling portion. The filling portion can limit the heat conducting plate 15 in the length direction (direction Y) of the battery module 1, and thus restrict the movement of the heat conducting plate 15 in the length direction (direction Y) of the battery module 1. In this way, the heat conducting plate 15, after being assembled, is limited in the length direction (direction Y), the width direction (direction X) and the height direction (direction Z) of the battery module 1, thereby increasing the reliability of the assembled heat conducting plate 15.

Each of the engaging portion 111b and the connecting portion 111a can have a shape of a rectangular block. It is obvious that the present disclosure is not limited to the shape. A width of the engaging portion 111b (in the direction X in FIG. 5) is greater than a width of the connecting portion 111a, and a width of the connecting portion 111a is adapted to a width of the second hole 151b. That is, a size of the first hole 151a in the width direction (direction X) of the battery module 1 is larger than a size of the second hole 151b in the width direction (direction X) of the battery module 1. The first hole 151a can be a rectangular hole, and the second hole 151b can also be a rectangular hole. It is obvious that the first hole 151a and the second hole 151b can have other shapes, as long as they can be fitted with the engaging portion 111b and the connecting portion 111a, respectively.

Figure 8:
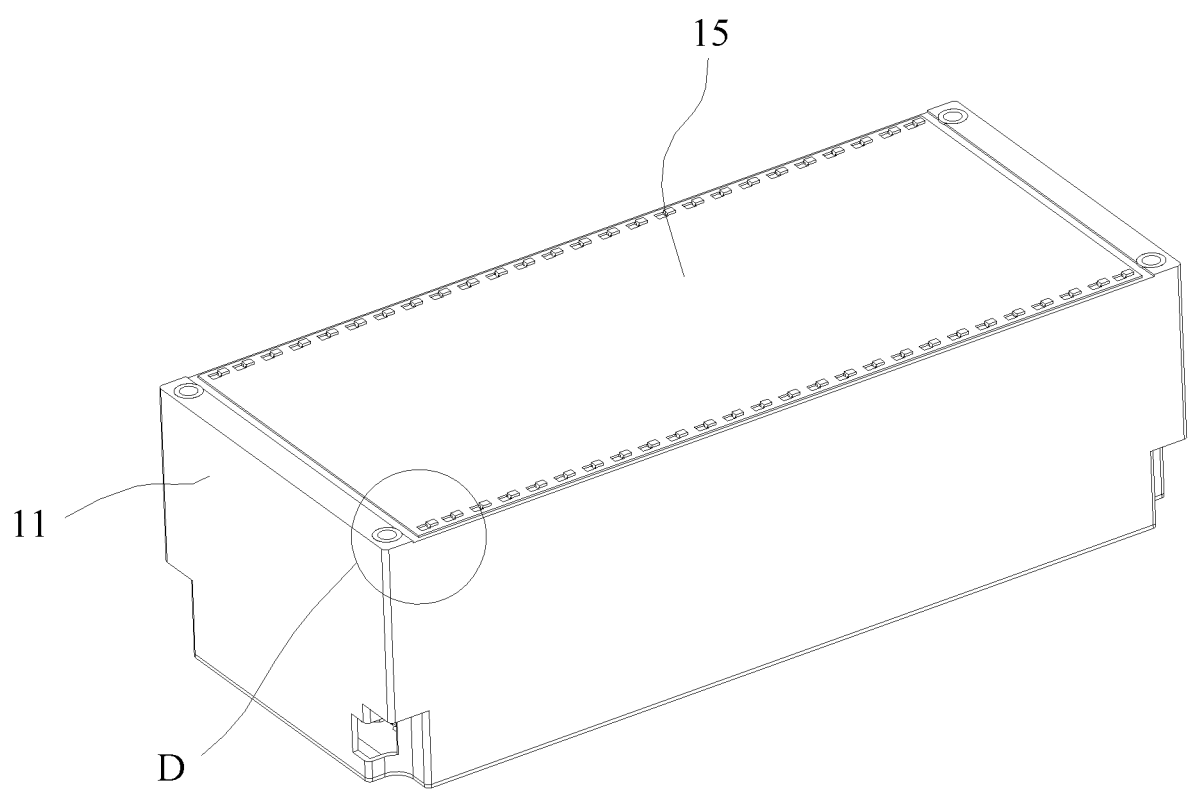
FIG. 8 is a schematic exploded view showing a structure of the battery module provided in the first embodiment of the present disclosure, in which the lower case and the heat conducting plate are fitted with each other.
Figure 9:
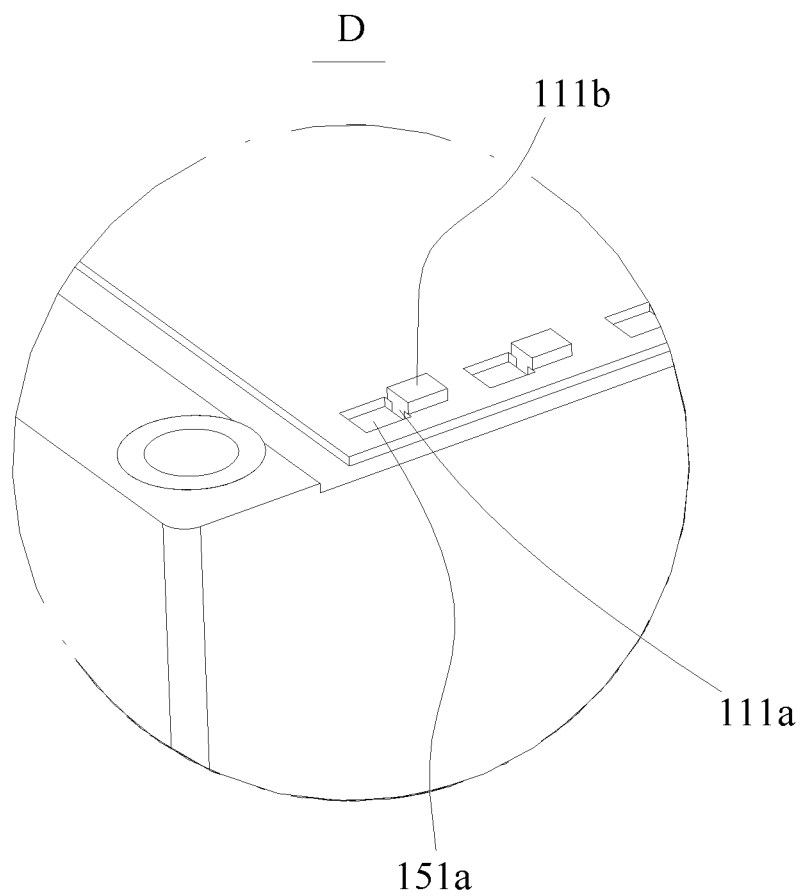
FIG. 9 is an enlarged view of a portion D in FIG. 8.

FIG. 8 is a schematic exploded view showing a structure of the battery module provided in the first embodiment of the present disclosure, in which the lower case and the heat conducting plate are fitted with each other, and FIG. 9 is an enlarged view of a portion D in FIG. 8.

As shown in FIG. 7 to FIG. 9, during assembling, the engaging portion 111b first passes through the first hole 151a, and then the heat conducting plate 15 is moved in such a manner that the engaging portion 111b and the connecting portion 111a slide towards the second hole 151b along the first hole 151a, until the connecting portion 111a is engaged in the second hole 151b. In this way, the engaging portion 111b limits the heat conducting plate 15, and the heat conducting plate 15 and the lower case 11 are locked with each other.

The above structure can achieve a quick assembly of the heat conducting plate 15, and the limitation effect of the engaging portion 111b prevents the heat conducting plate 15 from escaping, thereby improving the reliability of the connection between the heat conducting plate 15 and the lower case 11.

Figure 10:
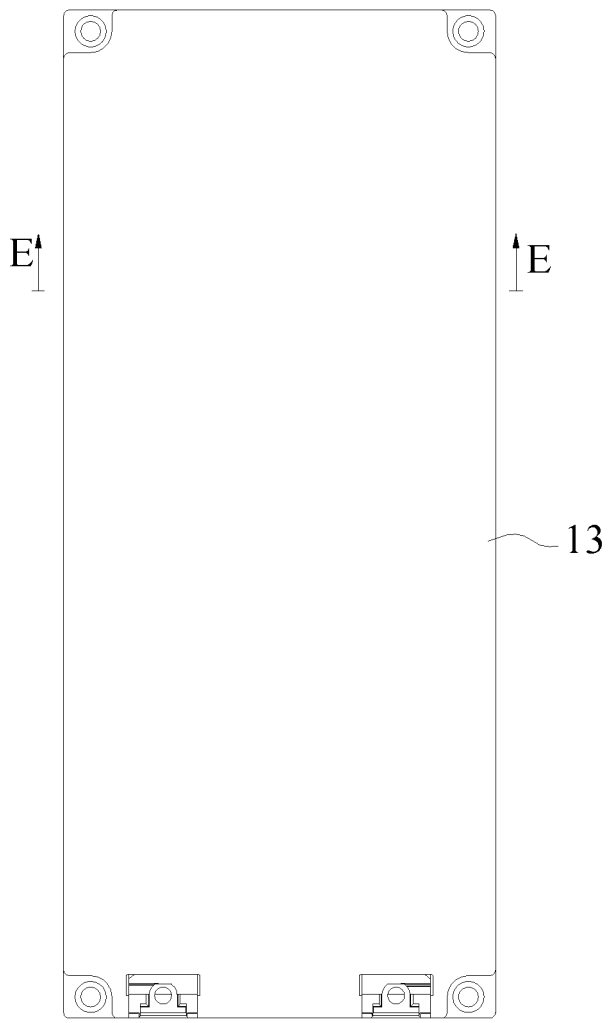
FIG. 10 is a top view of a battery module provided in a second embodiment of the present disclosure.
Figure 11:
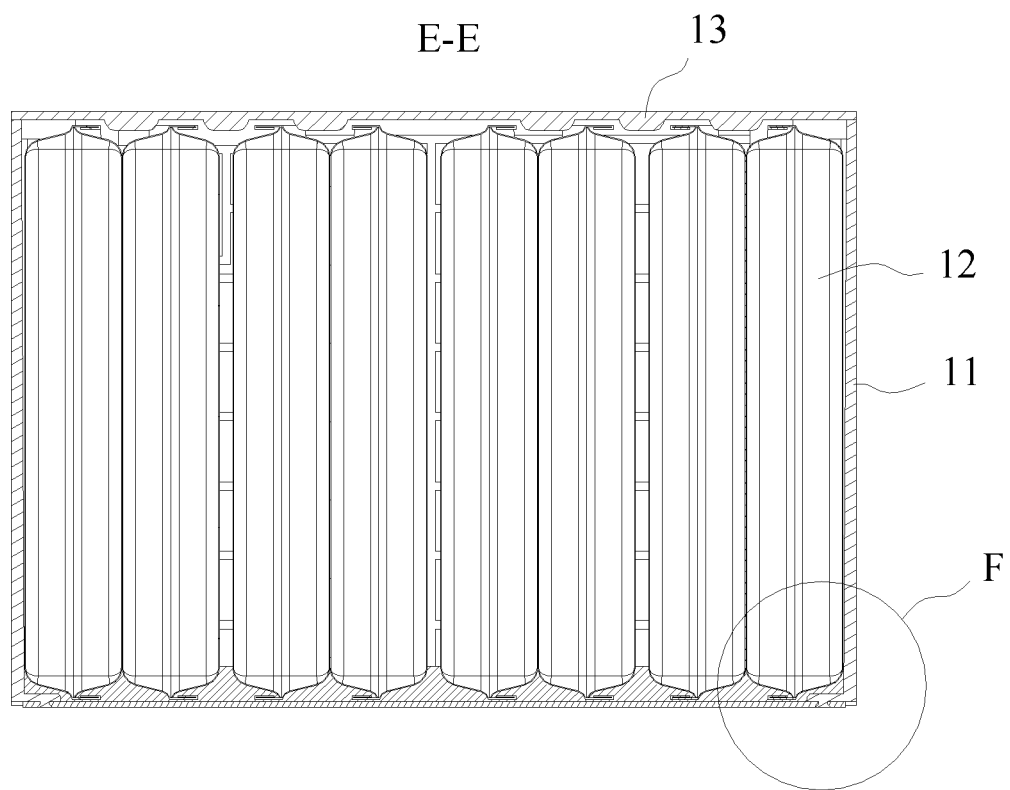
FIG. 11 is a cross-sectional view taken along line E-E in FIG. 10.
Figure 12:
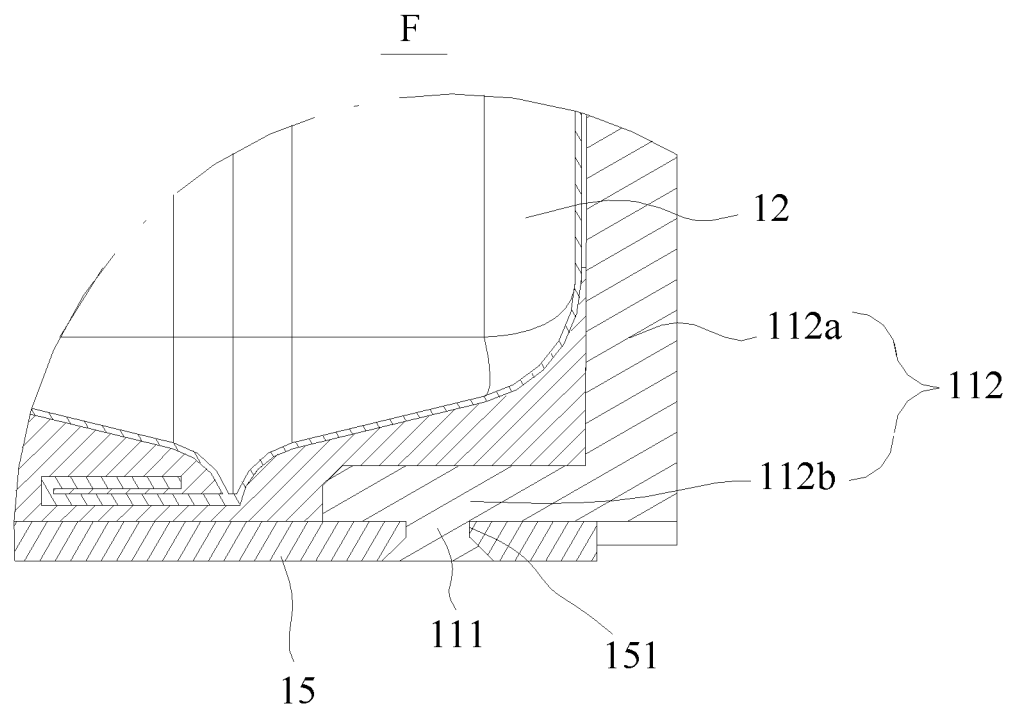
FIG. 12 is an enlarged view of a portion F in FIG. 11.

FIG. 10 is a top view of a battery module provided in a second embodiment of the present disclosure, FIG. 11 is a cross-sectional view taken along line E-E in FIG. 10, and FIG. 12 is an enlarged view of a portion F in FIG. 11.

In the present embodiment, structures of the boss 111 and the engaging hole 151 both differ from the structures of the boss 111 and the engaging hole 151 shown in FIG. 4. The engaging hole 151 shown in FIG. 12 is substantially a tapered hole, and an outer contour of the boss 111 is adapted to a shape of the engaging hole 151.

Figure 13:
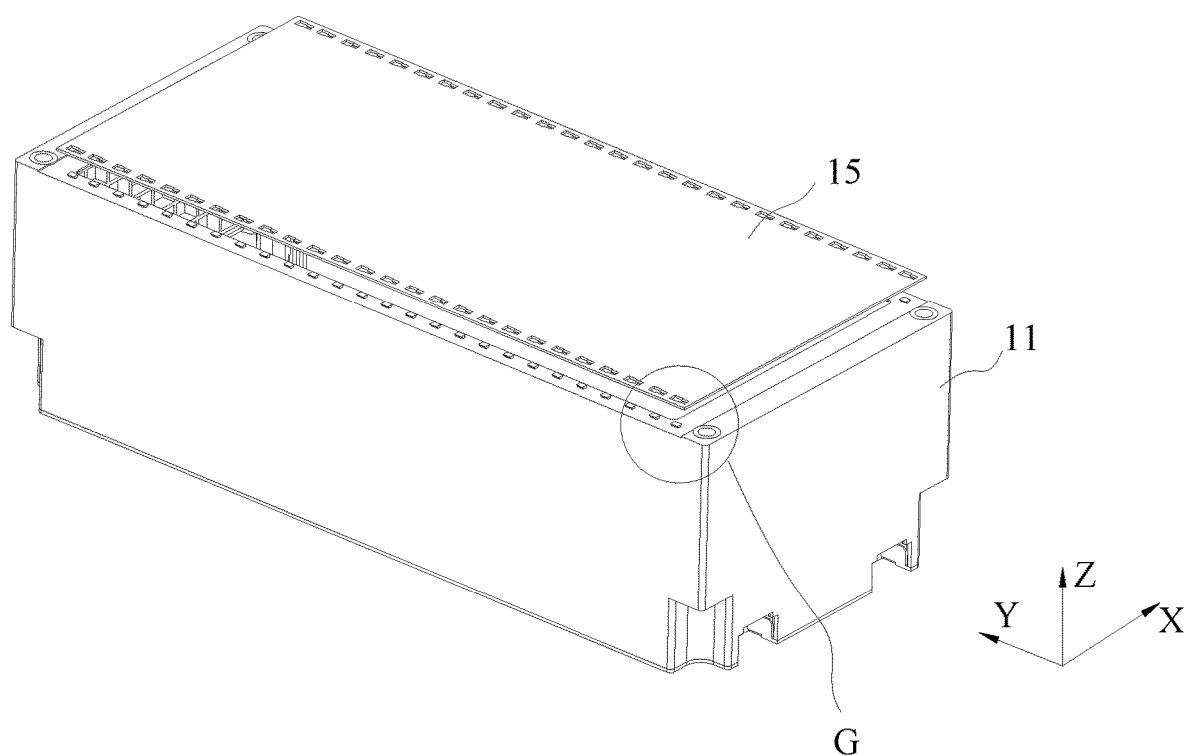
FIG. 13 is a schematic exploded view showing a structure of the battery module provided in the second embodiment of the present disclosure, in which the lower case and the heat conducting plate are to be fitted with each other.
Figure 14:
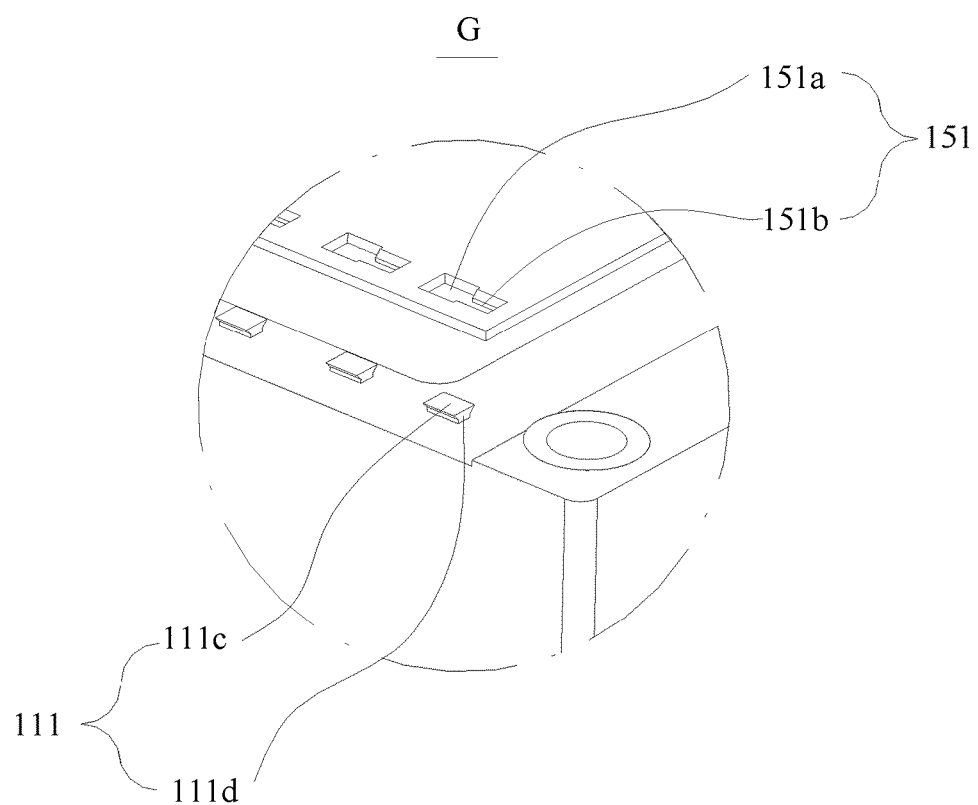
FIG. 14 is an enlarged view of a portion Gin FIG. 13.
Figure 15:
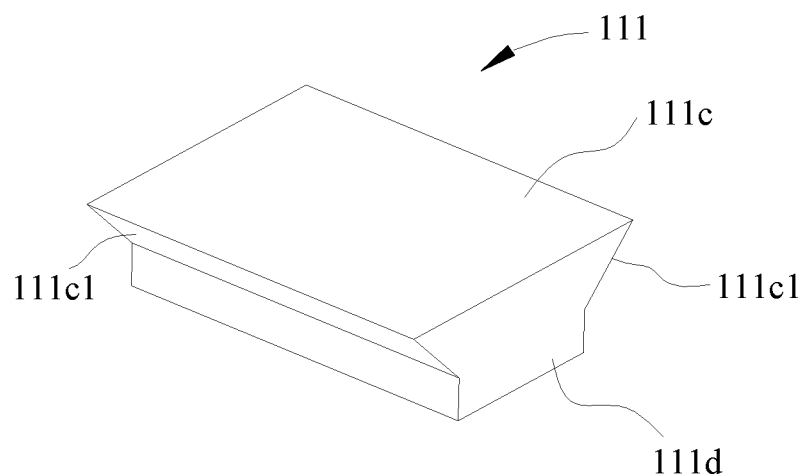
FIG. 15 is a structural schematic diagram of a boss in the battery module provided in the second embodiment of the present disclosure.
Figure 16:
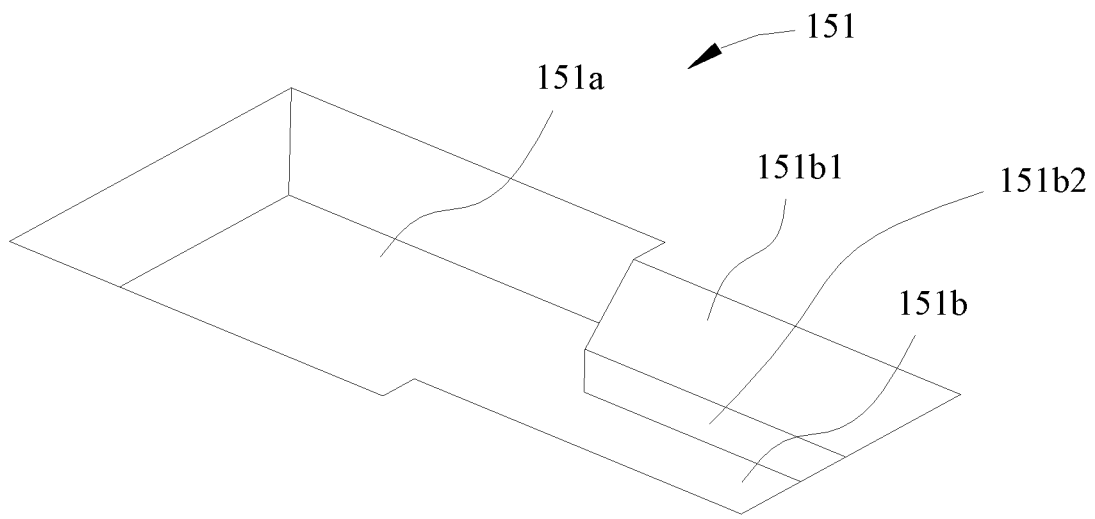
FIG. 16 is a structural schematic diagram of an engaging hole in the battery module provided in the second embodiment of the present disclosure.

FIG. 13 is a schematic exploded view showing a structure of the battery module provided in the second embodiment of the present disclosure, in which the lower case and the heat conducting plate are to be fitted with each other, FIG. 14 is an enlarged view of a portion G in FIG. 13, FIG. 15 is a structural schematic diagram of a boss in the battery module provided in the second embodiment of the present disclosure, and FIG. 16 is a structural schematic diagram of an engaging hole in the battery module provided in the second embodiment of the present disclosure.

For example, the boss 111 includes a first boss 111c and a second boss 111d. The first boss 111c, on its both sides, is provided with first oblique surfaces 111c1 inclining towards the second boss 111d. The engaging hole 151 includes a first hole 151a and a second hole 151b. An inner wall surface of the second hole 151b includes a second oblique surface 151b1 and a vertical surface 151b2 that are connected to each other, and the second oblique surface 151b1 inclines towards the vertical surface 151b2.

The first boss 111c has a substantially trapezoidal cross section in the height direction of the battery module 1 (direction Z in FIG. 13). The trapezoidal first boss 111c is broader at an upper end than a lower end, so as to form the first oblique surfaces 111c1. The second boss 111d has a substantially rectangular cross section in the height direction of the battery module 1 (direction Z in FIG. 13).

When the above first oblique surface 111c1 matches the second oblique surface 151b1, and the second boss 111d matches the vertical surface 151b2, a surface of the first boss 111c facing away from the second boss 111d is flush with a surface of the heat conducting plate 15 facing away from the lower case 11.

Figure 17:
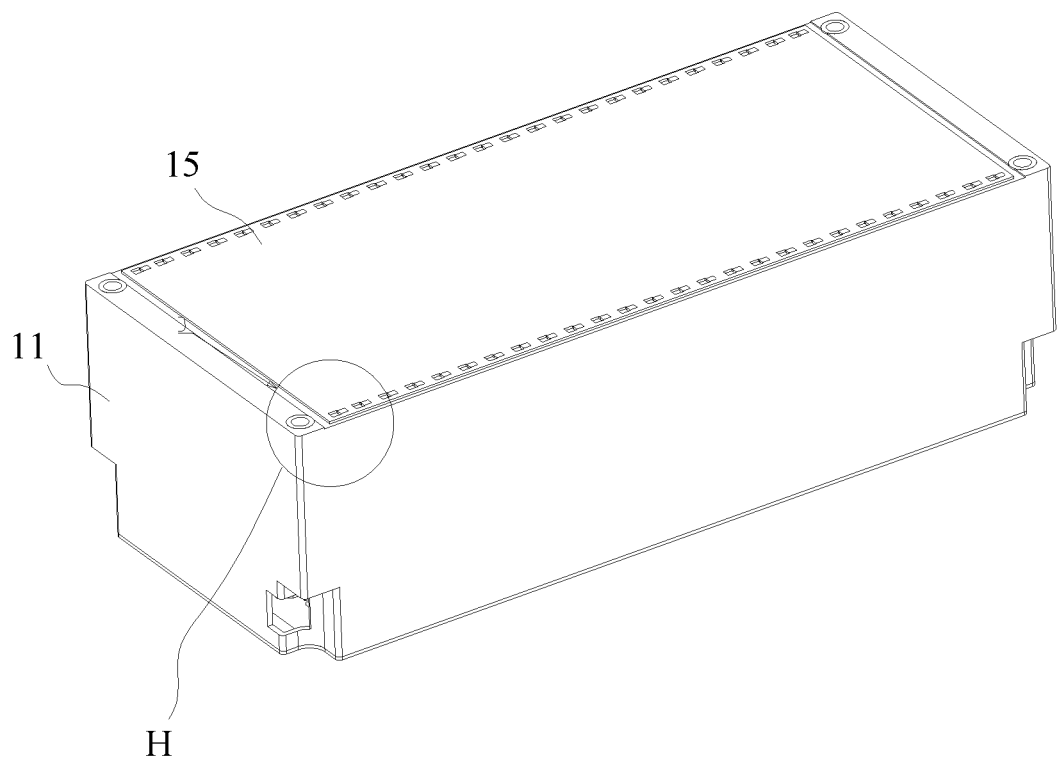
FIG. 17 is a schematic exploded view showing a structure of the battery module provided in the second embodiment of the present disclosure, in which the lower case and the heat conducting plate are fitted with each other.
Figure 18:
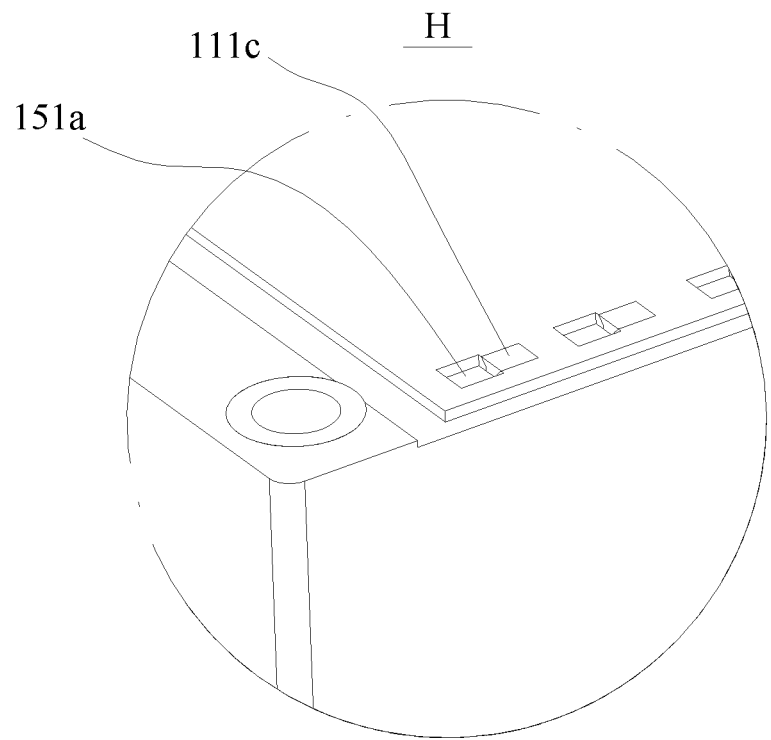
FIG. 18 is an enlarged view of a portion H in FIG. 17.

FIG. 17 is a schematic exploded view showing a structure of the battery module provided in the second embodiment of the present disclosure, in which the lower case and the heat conducting plate are fitted with each other, and FIG. 18 is an enlarged view of a portion H in FIG. 17.

As shown in FIG. 15 to FIG. 18, during assembling, the boss 111 is first assembled to pass through the first hole 151a, and then the heat conducting plate 15 is moved in such way that the boss 111 slides towards the second hole 151b along the first hole 151a, until the second boss 111d of the boss 111 slides into the second hole 151b and matches the vertical surface 151b2. In this way, through the limitation of the second oblique surface 151b1, the limiting of the boss 111 and the heat conducting plate 15 can be fixed. In this case, since the surface of the first boss 111c facing away from the second boss 111d is flush with the surface of the heat conducting plate 15 facing away from the lower case 11, the space occupied by the battery module 1 is reduced, thereby enhancing the energy density of the battery module 1.

As described above, the lower case 11 can be made of a polymer material having an insulating property, and is formed by a molding method such as injection molding, extrusion or mold pressing. In this way, the spattering during welding of the metal lower case in the related art and the failures of other components can be avoided, and thus the quality of the battery module is improved.

The battery cell 12 can have a square or cylindrical shape, which is not limited herein.

The upper cover 13 can be made of a polymer material having insulating property, and is formed by molding method such as injection molding, extrusion or mold pressing.

The heat conducting plate 15 is made of metal, which has a higher thermal conductivity than the lower case 11 and the upper cover 13. For example, the heat conducting plate is made of metal such as copper or aluminum, which is not further limited herein.

Further, the heat conducting plate 15 can be a rectangular plate, and a plurality of engaging holes 151 is provided. The plurality of engaging holes 151 is arranged at an edge portion of the heat conducting plate 15 along the length direction (direction Y) of the battery module 1. In the present embodiment, the rectangular plate 15 has a length dimension larger than its width dimension, and the engaging holes 151 are arranged at the edge portion of the heat conducting plate 15 along the length direction (direction Y) of the battery module 1, such that more engaging holes 151 can be provided to fit with the boss 111 on the lower case 11, when compared with the case in which the engaging holes 151 are arranged at the edge portion of the heat conducting plate 15 along the width direction (direction X) of the battery module 1. That is, there are more connecting points and the connection strength is greater, and thus the overall structural strength of the battery module 1 is improved.

In an embodiment, the lower case 11 is provided with a structural adhesive 14 fixed to the bottom of the lower case 11, and the structural adhesive 14 is preferably a heat conducting structural adhesive. During the assembling of the battery module 1, the lower case 11, the battery cells 12 and the upper cover 13 are assembled first, and then the adhesive is applied. Thus, the application of the adhesive can be monitored in real time, so as to ensure a good application effect of the adhesive. After the adhesive is applied, the engaging hole 151 of the heat conducting plate 15 is engaged and fitted with the boss 111 of the lower case 11 to form a stable connection between the heat conducting plate 15 and the lower case 11. In addition, the heat conducting structural adhesive is conducive to the heat transfer, and further improves the heat dissipation effect of the battery module 1.

The preferable embodiments of the present disclosure described above are not intended to limit the claims. Those skilled in the art can make various modifications and changes. Any modification, equivalent substitution and improvement made without departing from the concept of the present disclosure shall fall within the protection scope of the present disclosure.

What is claimed is:

1. A battery module, comprising:
   a lower case;
   a plurality of battery cells sequentially stacked and received in the lower case; and
   a heat conducting plate,
   wherein the lower case is connected to the heat conducting plate through an engaging assembly, and the engaging assembly is configured to limit relative movement of the lower case and the heat conducting plate in a height direction and a width direction of the battery module,
   wherein the engaging assembly comprises a boss formed on the lower case, and an engaging hole formed in the heat conducting plate; and the boss is engaged with and fitted in the engaging hole, and
   wherein the engaging hole comprises a first hole and a second hole that communicate with each other, a size of the first hole in the width direction of the battery module is larger than a size of the second hole in the width direction of the battery module, in such a manner that the boss is capable of passing through the first hole to be engaged with and fitted in the second hole, to limit relative movement of the lower case and the heat conducting plate in the height direction and the width direction of the battery module.

2. The battery module according to claim 1, wherein the lower case is made of an insulating material.

3. The battery module according to claim 1, wherein the heat conducting plate is made of metal.

4. The battery module according to claim 1, wherein the boss comprises a connecting portion and an engaging portion that are connected to each other; and
   the engaging portion is configured to pass through the first hole, the connecting portion is fitted in the second hole, and the engaging portion is configured to limit the heat conducting plate in the height direction of the battery module.

5. The battery module according to claim 4, wherein a filling portion is provided in the first hole, and the filling portion is configured to limit the heat conducting plate in a length direction of the battery module.

6. The battery module according to claim 1, wherein the boss comprises a first boss and a second boss;
   the first boss is provided with a first oblique surface on each of two sides of the first boss, the first oblique surface inclining towards the second boss;
   an inner wall surface of the second hole has a second oblique surface and a vertical surface that are connected to each other, the second oblique surface inclining towards the vertical surface; and
   when the first oblique surface matches the second oblique surface and the second boss matches the vertical surface, a surface of the first boss facing away from the second boss is flush with a surface of the heat conducting plate facing away from the lower case.

7. The battery module according to claim 1, wherein a plurality of engaging holes is provided at an edge portion of the heat conducting plate along a length direction of the battery module.

8. The battery module according to claim 1, wherein the lower case comprises two side plates and two end plates fixedly connected to the two side plates, respectively; and
   the boss is provided at a bottom of each of the two side plates.

9. The battery module according to claim 1, wherein the lower case is provided with a heat conducting structural adhesive fixed at a bottom of the lower case.

10. The battery module according to claim 1, further comprising an upper cover, wherein the upper cover and the lower case define a receiving cavity for receiving the plurality of the battery cells.

\* \* \* \* \*